No. 684,774. Patented Oct. 22, 1901.
W. T. BAGGS.
SCREW.
(Application filed Apr. 27, 1901.)
(No Model.)

Fig. 1ª.

Witnesses
M. S. Blondel
Clarence Shaw

Inventor
Walter T. Baggs.
By O'Meara & Co
Attorneys

THE NORRIS PETERS CO., PHOTO-LITHO., WASHINGTON, D. C.

United States Patent Office.

WALTER T. BAGGS, OF BALTIMORE, MARYLAND, ASSIGNOR OF ONE-HALF TO HARRY MERTZ, OF SAME PLACE.

SCREW.

SPECIFICATION forming part of Letters Patent No. 684,774, dated October 22, 1901.

Application filed April 27, 1901. Serial No. 57,761. (No model.)

*To all whom it may concern:*

Be it known that I, WALTER T. BAGGS, a citizen of the United States, residing at Baltimore, in the State of Maryland, have invented a new and useful Screw, of which the following is a specification.

This invention relates generally to screws, and more particularly to an improved construction of wood-screw, the object being to provide a screw which will act somewhat after the pattern of an auger or cutting bit for the purpose of cutting away a portion of the wood, so that the threads which follow can be more quickly and easily screwed "home."

The invention is particularly adapted to long screws, such as are used by electricians in fastening insulators and the like.

Heretofore screws as ordinarily constructed have required considerable time and strength to firmly seat them, and it is with the object of reducing both the time and labor incidental to the screwing operation that I have devised the present improvement.

My invention consists in providing a screw with one or more straight cutting-faces intermediate the point and head of the screw.

The invention consists also in certain details of construction and novelties of combination, all of which will be fully described hereinafter, and pointed out in the claims.

Figure 1:
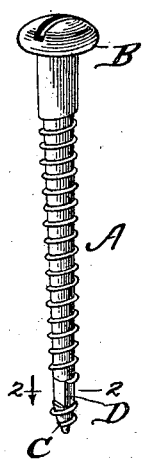
Figure 2:
Figure 2:
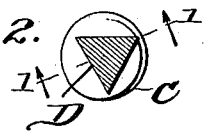

In the drawings forming part of this specification, Figure 1 is a perspective view of a screw constructed in accordance with my invention. Fig. 1$^a$ is a detail longitudinal section on about line 1 1 of Fig. 2. Fig. 2 is a cross-section taken on the line 2 2 of Fig. 1, and Figs. 3, 4, and 5 show slight modifications.

Figure 3:
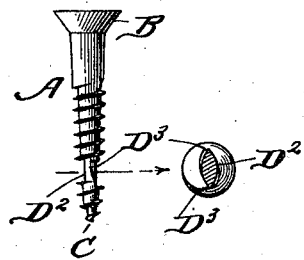

Referring to the drawings, A indicates the shank or body of the screw, B the head, and C the gimlet-point thereof. At any point between the point and head, but preferably adjacent to the point, I provide one or more straight cutting-faces D, and in the construction shown in Fig. 1 there are three such cutting-faces, the body of the screw being made essentially triangular in cross-section at that point, as shown in Fig. 2. In Fig. 3 the shank portion, which is devoid of threads, is spread or swaged somewhat, as shown at $D^2$, and formed with cutting or reaming edges $D^3$.

Figure 4:
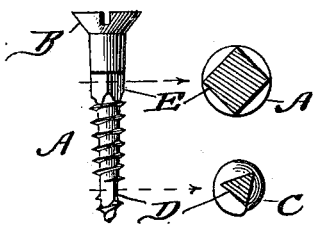

In Fig. 4 I have shown another modification in which the plain faces of the shank are arranged slightly out of line with each other, and adjacent to the head of the screw I also provide cutting edges E.

Figure 5:
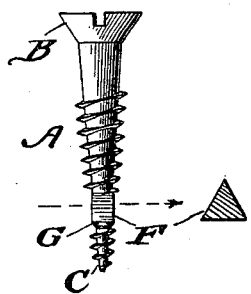

In Fig. 5 the shank is of peculiar formation, the threaded portion A and the gimlet-point C being the same as usual, but at the end of the threaded portion A the shank is made triangular in cross-section, but the edges F are made perpendicular, while the cutting edges G are arranged between the straight cutting portion F and the gimlet-point C. The general operation, however, is the same in each case, as I have found that a screw having one or more straight cutting edges intermediate the point and head can be more quickly and easily screwed into wood than the ordinary screw now in use.

Having thus fully described my invention, what I claim as new, and desire to secure by Letters Patent of the United States, is—

1. A wood-screw having the threaded shank and gimlet-point, the shank being devoid of threads adjacent to the point, said portion devoid of threads having cutting edges, substantially as shown and described.

2. A wood-screw having a threaded shank and gimlet-point, the portion of the shank adjacent to the point being devoid of threads and triangular in cross-section, the straight edges being cutting edges, substantially as and for the purpose described.

WALTER T. BAGGS.

Witnesses:
CHARLES E. TURNER,
HARRY MERTZ.